United States Patent
Zito et al.

(10) Patent No.: US 12,462,547 B2
(45) Date of Patent: Nov. 4, 2025

(54) ROBOTIC KITCHEN ASSISTANT FOR PREPARING FOOD ITEMS IN A COMMERCIAL KITCHEN AND RELATED METHODS

(71) Applicant: Miso Robotics, Inc., Pasadena, CA (US)

(72) Inventors: David Zito, Pasadena, CA (US); Sean Olson, Pacific Palisades, CA (US); Ryan Sinnet, Pasadena, CA (US); Robert Anderson, Pasadena, CA (US); Benjamin Pelletier, Pasadena, CA (US); Grant Stafford, Pasadena, CA (US); Zachary Vinegar, Los Angeles, CA (US); William Werst, Pasadena, CA (US)

(73) Assignee: Miso Robotics, Inc., Pasadena, CA (US)

( * ) Notice: Subject to any disclaimer, the term of this patent is extended or adjusted under 35 U.S.C. 154(b) by 0 days.

(21) Appl. No.: 18/215,123

(22) Filed: Jun. 27, 2023

(65) Prior Publication Data
US 2023/0351740 A1  Nov. 2, 2023

Related U.S. Application Data

(62) Division of application No. 16/490,534, filed as application No. PCT/US2018/021066 on Mar. 6, 2018, now abandoned.
(Continued)

(51) Int. Cl.
*G06V 10/82* (2022.01)
*A23L 5/10* (2016.01)
(Continued)

(52) U.S. Cl.
CPC ............. *G06V 10/82* (2022.01); *A23L 5/10* (2016.08); *A23L 5/15* (2016.08); *A47J 36/32* (2013.01);
(Continued)

(58) Field of Classification Search
CPC ...... A23L 5/10; A23L 5/15; A47J 36/32; A47J 37/06; A47J 37/12; B25J 9/0081;
(Continued)

(56) References Cited

U.S. PATENT DOCUMENTS 4,580,909 A * 4/1986 McIntosh .............. A47J 43/283
374/E7.031
5,132,914 A * 7/1992 Cahlander ............... A47J 27/14
700/211
(Continued)

FOREIGN PATENT DOCUMENTS

CN 104049548 A * 9/2014
CN 204619235 U * 9/2015
(Continued)

OTHER PUBLICATIONS

O'Shea, Keiron & Nash, Ryan; An Introduction to Convolutional Neural Networks; ArXiv e-prints; Nov. 2015; https://www.researchgate.net/publication/285164623_An_Introduction_to_Convolutional_Neural_Networks (Year: 2015).*

*Primary Examiner* — Erik Kashnikow
*Assistant Examiner* — Austin Parker Taylor
(74) *Attorney, Agent, or Firm* — Batt IP A Law Corporation; Richard Batt

(57) ABSTRACT

A flexible robotic kitchen assistant automates the preparation of food items. The robotic kitchen assistant includes a robotic arm, a sensor assembly comprising a plurality of cameras aimed at a kitchen workspace for preparing the food items, a controller operable to move the robotic arm, and a
(Continued)

processor. The processor is operable to command the robotic arm to perform a food preparation step on the food items in the kitchen workspace based on order information, recipe information, kitchen equipment information, and camera data. The system is capable of performing a wide range of tasks commonly used in residential and commercial kitchens and is able to work collaboratively with and in close proximity to human kitchen workers.

20 Claims, 10 Drawing Sheets

Related U.S. Application Data

(60) Provisional application No. 62/592,130, filed on Nov. 29, 2017, provisional application No. 62/467,743, filed on Mar. 6, 2017, provisional application No. 62/467,735, filed on Mar. 6, 2017.

(51) Int. Cl.
| | | |
|---|---|---|
| A47J 36/32 | (2006.01) | |
| A47J 37/06 | (2006.01) | |
| A47J 37/12 | (2006.01) | |
| B25J 9/00 | (2006.01) | |
| G02B 27/01 | (2006.01) | |
| G05B 19/42 | (2006.01) | |
| G06F 18/2413 | (2023.01) | |
| G06Q 10/0631 | (2023.01) | |
| G06Q 20/20 | (2012.01) | |
| G06Q 50/12 | (2012.01) | |
| G06T 7/70 | (2017.01) | |
| G06T 7/73 | (2017.01) | |
| G06V 10/764 | (2022.01) | |
| G06V 20/52 | (2022.01) | |
| G06V 20/68 | (2022.01) | |

(52) U.S. Cl.
CPC ............... *A47J 37/06* (2013.01); *A47J 37/12* (2013.01); *B25J 9/0081* (2013.01); *G02B 27/017* (2013.01); *G05B 19/42* (2013.01); *G06F 18/2414* (2023.01); *G06Q 10/06311* (2013.01); *G06Q 20/202* (2013.01); *G06Q 50/12* (2013.01); *G06T 7/70* (2017.01); *G06T 7/73* (2017.01); *G06V 10/764* (2022.01); *G06V 20/52* (2022.01); *A23V 2002/00* (2013.01); *G05B 2219/36184* (2013.01); *G05B 2219/40391* (2013.01); *G06T 2207/10024* (2013.01); *G06T 2207/10028* (2013.01); *G06T 2207/10048* (2013.01); *G06T 2207/20084* (2013.01); *G06V 20/68* (2022.01)

(58) Field of Classification Search
CPC .................. G02B 27/017; G05B 19/42; G05B 2219/36184; G05B 2219/40391; G06Q 10/06311; G06Q 20/202; G06Q 50/12; G06T 2207/20084; G06T 7/70; G06T 7/73; G06V 10/764; G06V 10/82; G06V 20/52; G06V 20/68; G03B 11/043; B62B 5/049
USPC ........................................................ 426/231
See application file for complete search history.

(56) References Cited

U.S. PATENT DOCUMENTS

| | | | | |
|---|---|---|---|---|
| 5,386,762 | A * | 2/1995 | Gokey | A47J 27/14 901/7 |
| 5,992,302 | A * | 11/1999 | Geisler | A47J 37/0611 99/421 V |
| 6,062,126 | A * | 5/2000 | Johnson | A47J 31/5253 340/309.7 |
| 6,102,162 | A * | 8/2000 | Teicher | G07F 17/0042 186/39 |
| 6,543,983 | B1 * | 4/2003 | Felder | B23Q 7/1442 414/389 |
| 6,856,247 | B1 * | 2/2005 | Wallace | G01K 1/026 374/E1.005 |
| 2007/0112461 | A1 * | 5/2007 | Zini | G05D 1/028 700/245 |
| 2008/0121636 | A1 * | 5/2008 | Hallgren | H05B 6/6435 219/710 |
| 2009/0210090 | A1 * | 8/2009 | Takemitsu | B25J 9/1661 901/1 |
| 2011/0168282 | A1 * | 7/2011 | Mitropoulos | A47J 37/1271 137/565.01 |
| 2011/0264266 | A1 * | 10/2011 | Kock | B25J 9/1676 700/255 |
| 2013/0220143 | A1 * | 8/2013 | Fetterman | A47J 27/10 99/330 |
| 2014/0220197 | A1 * | 8/2014 | Hocker | G01K 13/06 426/233 |
| 2014/0324607 | A1 * | 10/2014 | Frehn | G06Q 50/12 705/15 |
| 2015/0114236 | A1 * | 4/2015 | Roy | A47J 44/00 901/41 |
| 2015/0290795 | A1 * | 10/2015 | Oleynik | B25J 9/0081 700/257 |
| 2016/0037958 | A1 * | 2/2016 | Freymiller | A47J 37/0611 426/233 |
| 2016/0051078 | A1 * | 2/2016 | Jenkins | F24C 7/08 99/341 |
| 2016/0307459 | A1 * | 10/2016 | Chestnut | G06F 3/16 |
| 2016/0327281 | A1 * | 11/2016 | Bhogal | F24C 7/085 |
| 2017/0011653 | A1 * | 1/2017 | Minvielle | G06Q 30/0207 |
| 2017/0020332 | A1 * | 1/2017 | Strang | G06F 3/0304 |
| 2020/0367692 | A1 * | 11/2020 | Stipe | G06V 20/52 |
| 2022/0394158 | A1 * | 12/2022 | Ko | H04N 23/52 |

FOREIGN PATENT DOCUMENTS

| | | | | |
|---|---|---|---|---|
| JP | S5564736 | U * | 5/1980 | |
| JP | H02138694 | A * | 5/1990 | |
| JP | H0760676 | A * | 3/1995 | |
| JP | 2005001031 | A * | 1/2005 | |
| JP | 4655912 | B2 * | 3/2011 | |
| KR | 200330689 | Y1 * | 10/2003 | |
| KR | 2006117639 | A * | 11/2006 | A23B 7/04 |
| WO | WO-2016050914 | A2 * | 4/2016 | B62B 5/049 |

* cited by examiner

ROBOTIC KITCHEN ASSISTANT FOR PREPARING FOOD ITEMS IN A COMMERCIAL KITCHEN AND RELATED METHODS

CROSS-REFERENCE TO RELATED APPLICATIONS

This application is a divisional of U.S. Non-provisional application Ser. No. 16/490,534, filed Aug. 31, 2019, which is a national phase application of International PCT Application No. PCT/US18/21066, filed Mar. 6, 2018, and claiming the benefit of priority to U.S. Provisional Application No. 62/467,743, filed Mar. 6, 2017, U.S. Provisional Application No. 62/467,735, filed Mar. 6, 2017, and U.S. Provisional Application No. 62/592,130, filed Nov. 29, 2017.

TECHNICAL FIELD

This invention relates to food processing, and in particular, to automated kitchen apparatuses to prepare food in a commercial kitchen environment.

BACKGROUND OF THE INVENTION

Providing a robust and effective apparatus to prepare food for consumers is challenging because of the wide variety of types of food, cooking techniques, kitchen appliances, kitchen tools, and utensils.

Food preparation is often labor intensive and subject to human error. Workers employed by these businesses require careful and sometimes excessive training to accurately and safely prepare the food, thus increasing costs. Businesses that prepare and sell food typically have high labor costs and experience large amounts of monetary and food loss as well as customer dissatisfaction due to human error.

Various commercial food preparation equipment addresses some of the above-mentioned challenges.

An example of one type of food preparation equipment is a clamshell-type grill, a device to grill both sides of food items simultaneously, typically in large batches. The resulting cooked food items are then typically placed into a warming drawer prior to serving. A commercial example of this device is the ProGrill SL1557P, manufactured by the ProLuxe Company (Perris, California).

Another example of food preparation equipment is the conveyor fryer for French fries and other foods that are cooked using a frying process. The conveyor serves to benefit the cooking process by removing human error associated with timing, thereby improving consistency and throughput. This device generally comprises a large vat of oil that is heated and a system of mesh screens attached to a conveyor belt that move food items through the oil at a predetermined rate. Fried food items are then dispensed at the other end of the device. Kitchen workers place uncooked items into one side and retrieve cooked items on the other side. A commercial example of this device is the MasterMatic Compact Fryer, Model 350, manufactured by the Heat and Control Company (Hayward, California).

The above described food preparation equipment, however, has multiple limitations. For example, such equipment is limited to only one type of food. A clamshell grill, for instance, does not allow food items to be cooked to different levels in a single batch. Similarly, a conveyor-type fryer, can only be configured for cooking one type of item at a time as the cooking time is set by the speed of the conveyor belt. Consequently, it cannot be used to prepare more than one type of food unless the different types of food happen to have the same cooking time requirements.

Second, such food preparation equipment typically requires batch preparation of food items. For example, clamshell grills are typically designed to prepare multiple food items in batches and are not useful for preparing items individually.

Third, the increased mechanical and/or electrical complexity inherent in such devices often leads to increased failure rates versus conventional, non-automated versions of such devices, resulting in higher downtimes. Such downtimes can be especially costly for restaurants because restaurants do not typically have back-up equipment onsite and consequently they may not be able to cook a number of items on their menu which reduces average order size or even drives away potential customers.

Fourth, such food preparation equipment typically has a large footprint compared to conventional versions of the equipment and for the variety of items they are capable of cooking. This larger size is a challenge for restaurant owners because of the high cost of kitchen space. For example, the above mentioned MasterMatic fryer is substantially larger than a similar model without the automatic conveyor.

Fifth, the potential benefits of such food preparation equipment are often outweighed by their associated upfront costs. For example, automated frying equipment is significantly more expensive than conventional frying equipment.

These drawbacks present significant challenges to restaurant operators and are not consistent with consumer preferences for a wide variety of freshly cooked food and a restaurant's need for high reliability.

Other food preparation equipment addresses some of the above-mentioned challenges. For example, U.S. Pat. No. 5,389,764 to Nishii et al. (the '764 Patent) describes a cooking appliance that controls a cooking device on the basis of temperature information of an object to be cooked that is estimated from changes in physical characteristics. A neural network is taught, for a number of categories of food that are classified according to the temperature of the cooked and completed food, the relationship between changes in the physical characteristic, such as the temperature and humidity, generated during heating of the object to be cooked during cooking, and changes in temperature of the object at the center of the object and the surface of the object in order to provide for an automatic cooking operation.

Although the '764 Patent provides some degree of cooking automation, the described appliance requires the kitchen worker to identify the type of food and place the food within a cooking chamber.

In contrast, what is desired is a more robust system that may serve in a kitchen environment for preparing multiple types of food (perhaps newly placed or unknown food items), on a range of different types of cooking equipment and without being required to be placed in a controlled chamber. Indeed, many food preparation steps are performed outside of an oven.

Additionally, kitchen environments can vary widely and have a number of challenges which make automating food preparation processes difficult. For example, an important step in many automation schemes is identifying and locating food items, which is challenging in kitchen environments. One reason that identifying and locating food items is challenging because work surfaces in kitchen environments can have appearances that change rapidly. A griddle commonly used to cook items such as hamburger patties, chicken breasts, onions, and steaks, rapidly accumulates residuals such as grease, liquids, and particles from the food prepared on it. Due to high temperatures, these residuals are quickly carbonized, creating dark surfaces on the griddle which make automatic recognition of the food challenging in at least two ways: 1) they reduce the contrast between the food items to be identified and the work surface; and 2) they create an underlying source of variability in any sensor data that is collected.

Gases created during the cooking process also make collecting accurate sensor data difficult. Specifically, water and grease from food items and cooking surfaces may collect on sensors and obscure readings resulting in reduced signal to noise ratios for the affected sensors. Taken together, these challenges make obtaining accurate sensor data difficult.

Another challenge that makes automating kitchen processes challenging is the presence of human kitchen workers. Automation solutions in kitchens typically need to operate in close proximity to and oftentimes in collaboration with human kitchen workers. As a result, automation solutions must be able to operate safely around human kitchen workers and enable close collaboration in the preparation of food items.

Consequently, there is still a need for improved systems and methods for automating preparation of food in commercial kitchen environments, especially in restaurant kitchens.

SUMMARY OF THE INVENTION

A robotic kitchen assistant for automating preparation of food items includes a robotic arm, a sensor assembly comprising a plurality of cameras and sensors aimed at a kitchen workspace for preparing the food items, a controller and power supply operable to move the robotic arm, and a processor. The processor is operable to command the robotic arm to perform a food preparation step on the food items in the kitchen workspace based on various data or information such, for example, order information, recipe information, kitchen equipment information, camera data, and food item inventory information. The robotic kitchen assistant is capable of performing a wide range of tasks commonly employed in residential and commercial kitchens using existing equipment found in such kitchens.

In embodiments, the robotic kitchen assistant recognizes and locates food items using its sensors, monitors or tracks the food items, and computes a food preparation step or action based on the state of the food items and recipe information for the food items. The processor and sensors operate to recognize and locate a wide range of objects including the food, equipment, utensils, human kitchen workers or portions of the human kitchen worker. Consequently, the robotic kitchen assistant is adapted to safely work collaboratively with human kitchen workers, and to utilize existing kitchen equipment in the restaurant environment.

In embodiments, the robotic kitchen assistant has detailed information on some or all of the restaurant's recipes and is integrated with the restaurant's point of sale (POS) computer system and receives all restaurant orders.

In embodiments, the robotic kitchen assistant is also integrated with the restaurant's kitchen display system (KDS) and uses that system along with its own human interface to communicate information and instructions to the human kitchen worker.

In embodiments, the robotic kitchen assistant can be configured to place, remove, or flip a food item such as a patty. In embodiments, the robotic kitchen assistant can be configured to perform other kitchen tasks, including, but not limited to, those associated with frying, mixing, slicing, boiling, assembling, plating, frosting, roasting, and baking.

Embodiments of the invention include a number of developments by the inventors including one or more of the following: camera hardware and sensors suitable for kitchen use; systems of hardware and software for visual recognition of items relevant to kitchen tasks; end effectors suitable for the manipulation of food items by the system; systems of hardware and software to ensure human kitchen worker safety during close collaboration with the robotic system; systems of hardware and software for ensuring food safety and compliance with relevant food handling regulations; systems of hardware and software for remote monitor and teleoperation of system; and systems of hardware and/or software for portability and stable and secure usage within kitchen environments.

In embodiments, a method for a robotic kitchen assistant to assist a human kitchen worker in a restaurant kitchen to prepare a food item comprises: receiving a customer order; providing an instruction to a kitchen worker to perform a first task; determining when the first task is completed using a sensor or sensors; and robotically performing a second task to prepare the food item. In another embodiment, the robotic kitchen assistant performs the first task and the human kitchen worker is instructed to perform the second task.

In embodiments, the robotic kitchen assistant automatically maintains an inventory of cooked French fries (or similar batch prepared items) and human kitchen workers retrieve fries (or similar batch prepared items) from the receiving bin as orders arrive. In some cases, the targeted inventory of prepared fries varies during the day. In embodiments, the robotic kitchen assistant will compute the target inventory of prepared fries based on historical demand. In embodiments, the robotic kitchen assistant monitors the temperature of the prepared fries. In embodiments, the robotic kitchen assistant uses temperature information data and information on when batches of cooked fries were completed, incoming orders, historical demand, and/or visual analysis of the prepared fries in the receiving bin (including amount remaining), to determine when to prepare additional fries. In embodiments, the robotic kitchen assistant automatically maintains an inventory of other food items.

Embodiments of the invention offer a number of benefits to the restaurant owner, restaurant workers, or restaurant consumers.

Examples of potential benefits for restaurant owners include: performing kitchen tasks exactly to specifications, without human error, thereby eliminating the waste and customer dissatisfaction associated with preparation errors; preparing items more quickly; preparing food with less staff; and reducing the impact of absent or late employees on the output and overall functioning of the restaurant.

Examples of potential benefits for restaurant workers include: handling jobs that can be dangerous or are generally not preferred by restaurant workers, including, but not limited to frying, slicing, and grilling; and improving restaurant workers' job satisfaction arising from the innovative nature of the system and the need for interacting closely with it.

Examples of potential benefits for restaurant consumers include: improving the consistency and quality of the food items prepared by a restaurant as the system will adhere exactly to recipes; or increasing food safety by ensuring that all items are cooked to appropriate internal temperatures, cleanliness procedures are strictly followed, and/or, in some cases, items contacting food are kept at elevated temperatures.

The description along with additional objects and advantages of the present invention will become apparent from the detailed description to follow, together with the accompanying drawings.

DETAILED DESCRIPTION OF THE INVENTION

Figure 1:
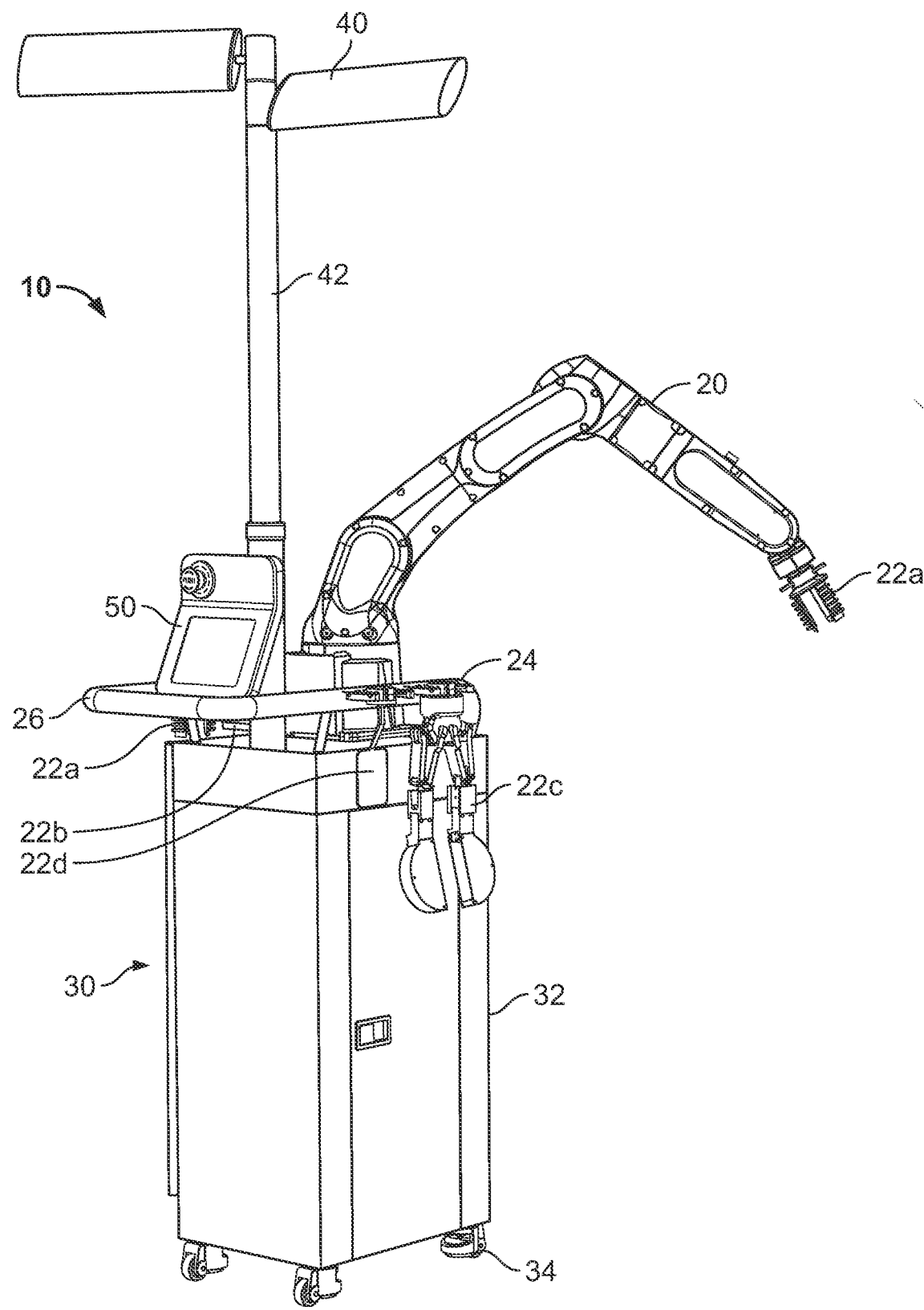
FIG. 1 illustrates a robotic kitchen assistant.

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail).

Amongst other patent applications and patents listed herein, each of the following provisional patent applications are incorporated by reference in their entirety: No. 62/467,743, filed Mar. 6, 2017, and entitled "ROBOTIC SYSTEM FOR PREPARING FOOD ITEMS IN A COMMERCIAL KITCHEN"; No. 62/467,735, filed Mar. 6, 2017, and entitled "VISUAL INSTRUCTION DISPLAY SYSTEM TO ENHANCE EFFICIENCY OF WORKERS"; and No. 62/592,130, filed Nov. 29, 2017, and entitled "AN INFRARED-BASED AUTOMATED KITCHEN ASSISTANT SYSTEM FOR RECOGNIZING AND PREPARING FOOD AND RELATED METHODS."

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Last, it is to be appreciated that unless defined otherwise, all technical and scientific terms used herein have the same meaning as commonly understood by one of ordinary skill in the art to which this invention belongs.

Apparatus Overview

FIG. 1 depicts a robotic kitchen assistant 10 in accordance with one embodiment of the invention.

Industrial Robot Arm

The robotic kitchen assistant includes a robotic arm 20 extending from a housing 30. The robotic arm 20, as discussed further herein, operates to perform one or more of the food preparing steps in completing a customer order. An example of a robotic arm is a Fanuc LR-Mate 200iD 7LC manufactured by FANUC Corporation of Japan which includes multiple electric motors to provide motion. However, other robotic arms from other companies with similar capabilities could be used. In embodiments, the robotic arm has 6 or 7 degrees of freedom. Additionally, where regulations require it, the industrial robotic arm will be food-grade or covered with a sleeve or similar material to ensure compliance with such regulations. In some embodiments, the sleeve is pressurized with clean, dry air to limit contamination.

Although the above described robotic arm has been identified as an industrial version and quality, in other embodiments, the robotic arm is a lower quality robot having reduced performance specifications. In embodiments, for example, the robotic arm is an XYZ rail system.

End-Effectors

The robotic kitchen assistant 10 includes an end effector 22a detachably mounted to the robotic arm 20. The end-effector, in combination with the robotic arm 20, manipulates the food and can carry out a food preparation step in the kitchen to complete a customer order.

The design of the end effectors may vary widely. Exemplary shapes include clamp (e.g., reference numeral 22a shown in FIGS. 1-2), scraper (e.g. reference numeral 22b shown in FIG. 2), patty collector tool (e.g., reference numeral 22c shown in FIGS. 1-2), spatula (e.g., reference numeral 22d shown in FIGS. 1-2), cup, grabber, suction-based grabber, scoop, pliers, fork, knife, and hook. Additionally, in embodiments, the end-effectors include a base end-effector that can be inserted into a range of food manipulation end-effectors quickly and accurately to enable the robotic kitchen assistant to perform a wide variety of kitchen tasks.

Tool Changer

The robotic kitchen assistant 10 is shown including a tool changer 24 mounted to rail 26 of the housing. The various end-effectors 22*a*-22*d* can be held by the tool changer 24. The tool changer 24 enables specific end effectors to be applied to the robotic arm quickly and efficiently. The tool changer 24 may also include items such as steam sprays, mechanical scrapers, and ultrasonic baths, to clean the end-effectors. When commanded by the robotic kitchen assistant 10, in embodiments, the robotic arm automatically swaps out one type of end effector for another type of end effector at the tool changer 24.

Sensor Bar

A sensor bar 40 is shown supported above the housing 30 by a frame element 42. The sensor bar 40 can include a wide variety of types of sensors and cameras as discussed further herein. In embodiments, one or more sensors or cameras operate with the processor to locate and recognize food items and other objects in the kitchen. Preferably the cameras are supported by frame element 42 of the robotic kitchen assistant and aimed at the applicable kitchen work areas. However, in embodiments, sensors are incorporated with other components or locations of the robotic kitchen assistant or into kitchen equipment or the kitchen work area. For example, in embodiments, the end-effectors 22 are equipped with sensors (e.g., proximity sensors) to provide positioning data on food items and other objects. In embodiments, the end-effector includes both a tool for food manipulation such as a spatula for tongs as well as a temperature probe that is inserted into food items to collect measurements of internal temperatures. In embodiments, the temperature probe contains a heater to raise the temperature of the probe to an elevated level between readings in order to prevent cross contamination of food items.

Display

FIG. 1 also shows display 50 to interface with a human kitchen worker. Examples of a display 50 include, without limitation, a monitor or touchscreen display. The kitchen worker may input information to the robotic kitchen assistant via the touchscreen display. Also, instructions may be shown to the kitchen worker on the display 50. In embodiments, the screen displays upcoming motions to be performed by the robot arm to enhance collaboration with human kitchen workers. In embodiments, instructions for the human kitchen worker are projected onto the work area or food item either directly via a laser projection system or similar system or virtually via augmented reality glasses.

Support Frame Housing

With reference to FIG. 1, robotic kitchen assistant 10 is shown including a support frame or housing 30 which distributes loads from the robotic arm to mounting mechanisms to minimize any motion of the system. In the exploded view shown in FIG. 2, it can be seen that the housing includes walls 32, wheels 34, stand 37, base 38, and frame element 42.

Mounting Mechanisms

Figure 2:
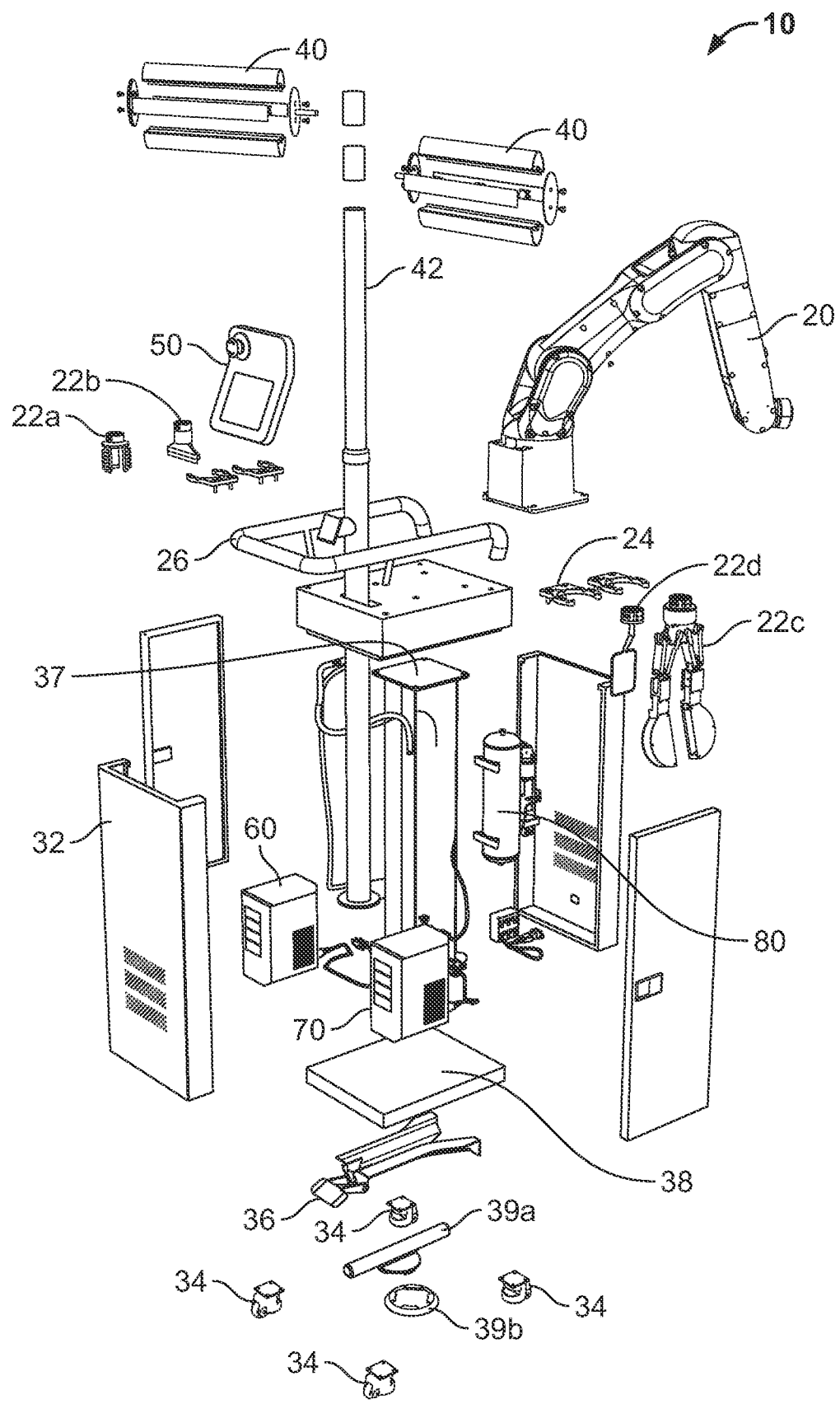
FIG. 2 is an exploded view of the robotic kitchen assistant shown in FIG. 1.

FIG. 2 also illustrates a foot pedal 36 secured to the base 38. The foot pedal includes a feature (e.g., groove or slot) which can lock and release to a mating mounting fixture 39*a* (e.g., tongue or tab). During operation, the robotic kitchen assistant 10 is preferably held in place with mounting mechanism 39*a* that is attached into the floor using anchor 39*b*. The mounting mechanisms 39*a*, 39*b* connect the robotic kitchen assistant 10 securely to the floor. The mounting mechanisms 39 are designed to allow the robotic kitchen assistant to be secured to the floor and also to be easily released from the floor when desired. Secure and release may be actuated manually, or in embodiments, electrically or otherwise carried out. In embodiments, secure and release is done electrically and there is no foot pedal.

Each robotic kitchen assistant may have multiple sets of mounting mechanisms at different kitchen stations so that the robotic kitchen assistant can be conveniently released from one location, moved, and secured in another location in the restaurant to perform different tasks.

In other embodiments, the robotic kitchen assistant is adapted to attach to commercial equipment with mechanical and/or magnetic clamps. In other embodiments, the robotic kitchen assistant is integrated directly into commercial equipment.

FIG. 2 also shows a number of components held within the housing walls 32 to support operation of the robotic kitchen assistant including, for example, computer or server 60, power supply and other supporting electronics and hardware 70, a motor, engine, or pneumatic system 80, etc.

Figure 3:
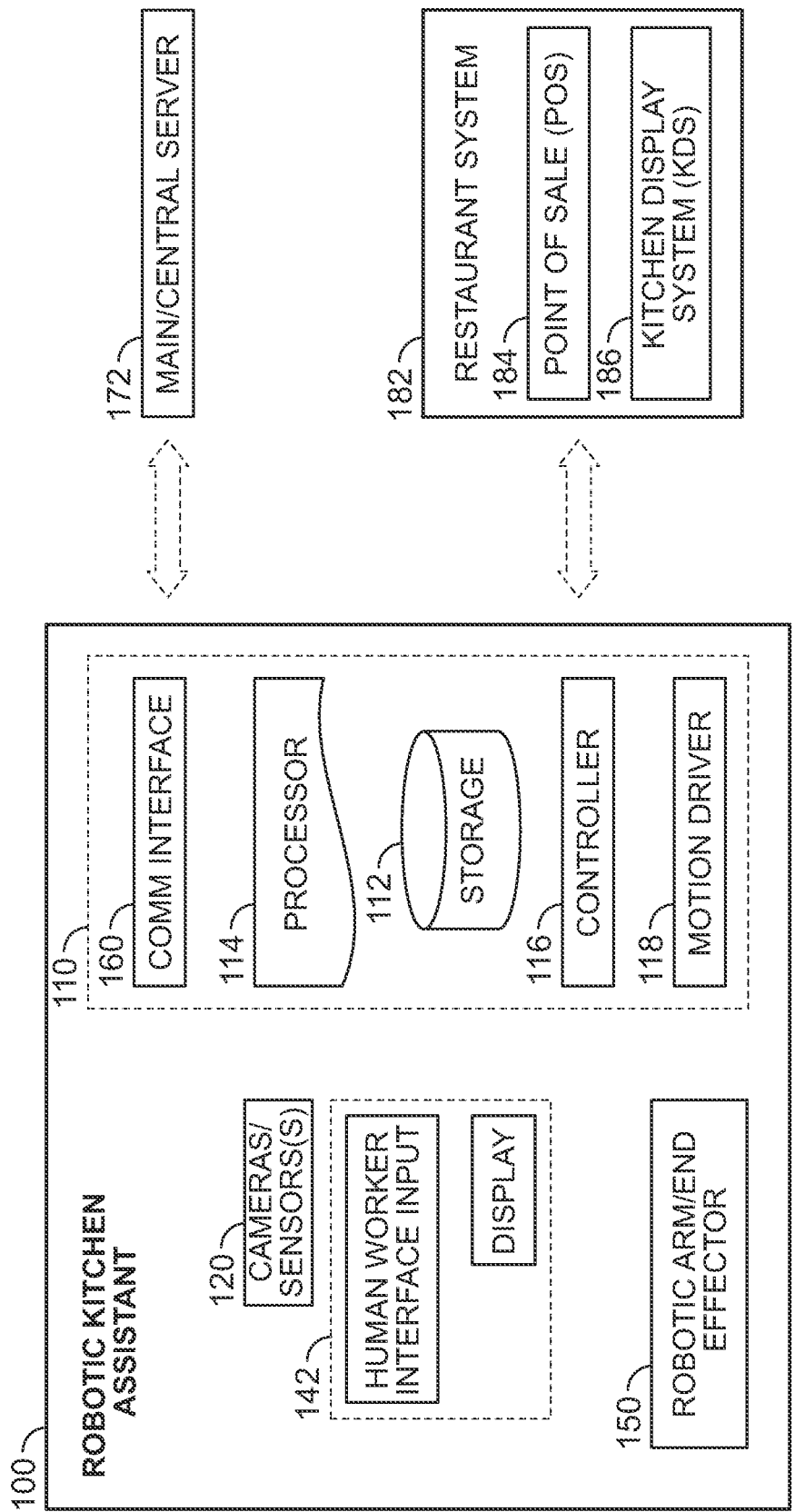
FIG. 3 is a block diagram of a robotic kitchen assistant.

FIG. 3 is a block diagram of a robotic kitchen assistant 100 in accordance with an embodiment of the invention. The system 100 is shown including a housing 110 for holding various electronics, pneumatics, computer hardware and software such as storage 112, a programmed processor 114, controller 116, motion driver 118, and communication interface 160. As described herein the storage 112 may be preloaded with various information relating to recipe data, kitchen equipment parameters, and computer instructions for the processor to read and perform.

The type of computer hardware may vary. Preferably, the computer is a high-end consumer PC (e.g., quad-core and above Intel processor) with high-end consumer graphics cards (e.g., Nvidia GTX-1080), SSD hard-disks, high-bandwidth networking adapter, and USB 3 ports.

The computer is programmed to carry out a wide variety of steps as described further herein. In embodiments, the software computes instructions to control the robotic kitchen assistant based on inputs from sensors and restaurant computer systems. In preferred embodiments, the software incorporates at least one convolutional neural network (CNN) and a range of additional algorithms, methods, and processes for visual recognition and localization of the food items and other kitchen objects to determine instructions for the robotic kitchen assistant and/or human kitchen workers.

The computer hardware and software are preferably connected to the internet. The computing hardware and components of the robotic kitchen assistant 100 can be linked to other servers in a local network or remote cloud-based network. In embodiments, a main/central server 172 is linked to the robotic kitchen assistant via the internet and communication interface 160 to send and receive information to and from the robotic kitchen assistant.

Additionally, the robotic kitchen assistant can be linked to the restaurant software system 182 including a point of sale system (POS) 184 and/or kitchen display system (KDS) 186. Customer order information may be received in real time from the POS 184. Order status and the instructions may be presented to the restaurant workers on the KDS 186.

The robotic kitchen assistant 100 is also shown including cameras and sensors 120 which, as described further herein, can automatically recognize and locate various food items as well as determine doneness of a food item being cooked.

Cameras

A wide variety of cameras may be used by the robotic kitchen assistant to observe or view the work space. In embodiments, the cameras employed include Blackfly 2.3 MP Color USB3 Vision camera with Sony Pregius IMX249 sensor with Fujinon CF12.5HA-1 lens with focal length of 12.5 mm. However, other cameras may be used. In embodiments, IR cameras are used for object recognition and/or temperature sensing. An exemplary IR sensor is the CompactPro high resolution thermal imaging camera manufactured by Seek Thermal Corporation (Santa Barbara, CA), which can provide an image of size 320×240 with each value a 16-bit unsigned integer representing measured thermal intensity.

In some embodiments, supplemental lighting and/or bandpass filters may be employed to improve the quality of images captured by the cameras.

In some embodiments, various methods and hardware are used to reduce or prevent contamination of cameras and other sensors by contaminants commonly found in commercial kitchens, including grease, smoke, and moisture. For example, as discussed further herein, air may be directed across the lens to prevent smoke and grease from accumulating. In embodiments, a transparent safety covering may be placed over the sensors to protect them from contamination. In embodiments, the transparent safety covering maybe be heated to reduce the amount of air-born liquids that condense on its surface. In embodiments, air may be blown across the surface of the transparent safety cover to reduce contamination. In embodiments, the air flow is engineered to maximize the likelihood of laminar airflow to prevent optical path differences that could interfere with camera and/sensor readings.

Sensors

Other types of sensors can be used to provide additional information, e.g., range, distance, depth, 3D depth, visual, and/or motion. Examples of sensors include sensing systems incorporating projected infrared grids, such as the one used by the Xbox Kinect v1 sensor (developed by PrimeSense of Tel-Aviv, Israel, now owned by Microsoft Corporation), and systems employing time-of-flight technologies, such as the one used by Xbox Kinect v2.

In embodiments, 3D sensors (sometimes referred to as 3D cameras) are employed using any number of technologies including, for example, time of flight, LiDAR and structured light technologies. An example of a time of flight sensor used for 3D sensing is Texas Instruments $2^{nd}$ Generation QVGA 3D ToF Chipset, available from Texas Instruments of Dallas, Texas.

The robotic kitchen assistant 100 may also be outfitted with other types of sensors, such as proximity sensors for determining the presence of workers in certain areas for safety reasons or for determining the amount of a certain ingredient remaining in storage. In embodiments, an electronic safety fence that uses light to detect the presence of human kitchen workers in a given area is used. An example of such an electronic safety fence is the Keyence SZ-V04, manufactured by Keyence Corporation (Elmwood Park, New Jersey, USA).

In some embodiments, a temperature sensor are used to determine the temperature of food items and/or the grill surface. In embodiments, the temperature sensor is an infrared camera.

In some embodiments, electronic chemical sensors may be used to detect if food items are prepared correctly and/or safe for human consumption for a food-borne contamination perspective.

Additionally, (light detection and ranging sensor) Lidar and ultrasonic-based sensors can be employed to locate and identify food items, workers, and equipment.

In embodiments, the plurality of sensors 120 includes a visible spectrum camera (e.g., a black and white, or RGB camera), a depth sensor (or sometimes referred to as a 3D sensor), and an infrared (IR) camera.

The infrared or IR camera generates IR image data by measuring the intensity of infrared waves and providing data representing such measurements over the observed area. In embodiments, the focal length of the camera lens and orientation of the optics has been set such that the area imaged includes the work area. Preferably, the IR camera is adapted to measure the intensity of IR waves over an area and generates IR image data. Preferably, the IR wavelength ranges from 7.2 to 13 microns, but other wavelengths in the IR may be used. An exemplary IR sensor is the CompactPro high resolution thermal imaging camera manufactured by Seek Thermal Corporation (Santa Barbara, CA), which can provide an image of size 320×240 with each value a 16-bit unsigned integer representing measured thermal intensity.

In embodiments, the visible spectrum camera is an RGB camera to generate image data. The RGB image comprises a 960 by 540 grid with intensity data for red, green, and blue portions of the spectrum for each pixel in the form of 8-bit unsigned integers. In embodiments, the focal length of the camera lens and orientation of the optics have been set such that the area imaged includes the work surface. An exemplary visible spectrum sensor is the Kinect One sensor manufactured by Microsoft Corporation (Redmond, Washington) as well as the Blackfly 2.3 MP Color USB3 Vision camera with Sony Pregius IMX249 sensor with Fujinon CF12.5HA-1 lens with focal length of 12.5 mm.

A depth sensor incorporates a time of flight (TOF) camera to generate data on the distance of each point in the field of view from the camera. The TOF camera is a range imaging camera system that resolves distance based on the known speed of light, measuring the time-of-flight of a light signal between the camera and the subject for each point of the image. In embodiments, the image comprises a 960 by 540 grid with a value of the distance from the sensor for each point in the form of a 16-bit unsigned integer. An exemplary depth sensor is the Kinect One sensor manufactured Microsoft Corporation (Redmond, Washington).

Regarding the infrared camera sensors, and without intending to be bound to theory, the inventors have discovered the IR camera sensors providing IR image data have the potential to mitigate or overcome the above-mentioned challenges of identification of objects in a kitchen environment associated with conventional automated cooking equipment. Due to the temperature differences typically present when an uncooked food is placed on a hot grill or other high temperature cooking surface or when a kitchen worker or kitchen worker's appendage is imaged against a predominantly room temperature background, IR camera sensors are able to provide high contrast and high signal-to-noise image data that is an important starting point for determining identity and location of kitchen objects, including food items, food preparation items and human kitchen workers. In contrast, the signal-to-noise ratio is significantly lower using only traditional RGB images than if using IR images. This occurs because some kitchen backgrounds, work surfaces, and cooking surfaces can be similar to food items in color, but temperatures are generally significantly different. Based on the foregoing, embodiments of the invention include IR-camera sensors in combination with other types of sensors as described herein. Use of IR sensors for assisting with food preparation is also described in provisional patent application No. 62/592,130, filed Nov. 29, 2017, and entitled "AN INFRARED-BASED AUTOMATED KITCHEN ASSISTANT SYSTEM FOR RECOGNIZING AND PREPARING FOOD AND RELATED METHODS", incorporated herein by reference in its entirety.

Human Interface

FIG. 3 also shows human interface 142 which may be in the form of a keyboard, monitor, touchscreen display or another device capable of communicating information to human kitchen workers and/or receiving input.

Additionally, in embodiments of the invention, the robotic kitchen assistant 100 is connected to the Internet as well as the restaurant's sales software 182. The restaurant's sales software 182 includes the point of sale (POS) 182 and, in some embodiments, kitchen display system (KDS) 186.

In embodiments, an Internet connection enables remote operation. The Internet connection also makes it possible to transmit data on the robotic kitchen assistant's operation to the servers (e.g., main or central server 172) and for the data to be analyzed to improve the performance of the system. In embodiments, software exceptions are uploaded to servers, analyzed to generate improvements to the robotic kitchen assistant software, which is then downloaded to the robotic kitchen assistant. In this way, the robotic kitchen assistant can be adapted to constantly learn as it performs its tasks.

Motion Driver

The robotic kitchen assistant 100 shown in FIG. 3 also includes a motion driver 118 to power or drive components such as to make the robotic arm move or actuate the end-effectors. In embodiments, the motion driver 118 is electrical and/or pneumatic-based.

In a preferred embodiment, and with reference again to FIG. 2, a pneumatic system 80 (such as an air compressor, control valves, and pressurized air cylinder reservoir) is shown to provide pressurized air for mechanical actuation of the end effectors. Pneumatics for powering the end effectors may be in addition to, and controlled independently from, electrical hardware which drives the motors in the robot arm. In embodiments, the pneumatic system may also provide air to create positive pressure in certain areas such as a sleeve covering the robotic arm to prevent contamination of the system. The pneumatic system may also have a vacuum pump, reservoir, and vacuum lines to provide vacuum for such applications as suction based end effectors. In embodiments, the pneumatic system may also be used to power the tool changing system. In embodiments, an air compressor and reservoir is used to limit the contamination of camera lenses by directing air in front of or against the camera lenses or sensor bar.

Operation Overview

Set-Up

When the robotic kitchen assistant is installed at a new location, it is given or has stored thereon a wide range of information. Examples of types of information stored include without limitation: recipe or food information including information on some or all recipes, ingredients and time required for some or all food preparation steps; and kitchen equipment information including location, dimensions, and key operating parameters (e.g., maximum temperature) of all kitchen equipment.

Kitchen Equipment

The robotic kitchen assistant is operable with a wide range of kitchen equipment. Examples of kitchen equipment include grills, ranges, assembly areas, fryers, and storage.

Figure 4:
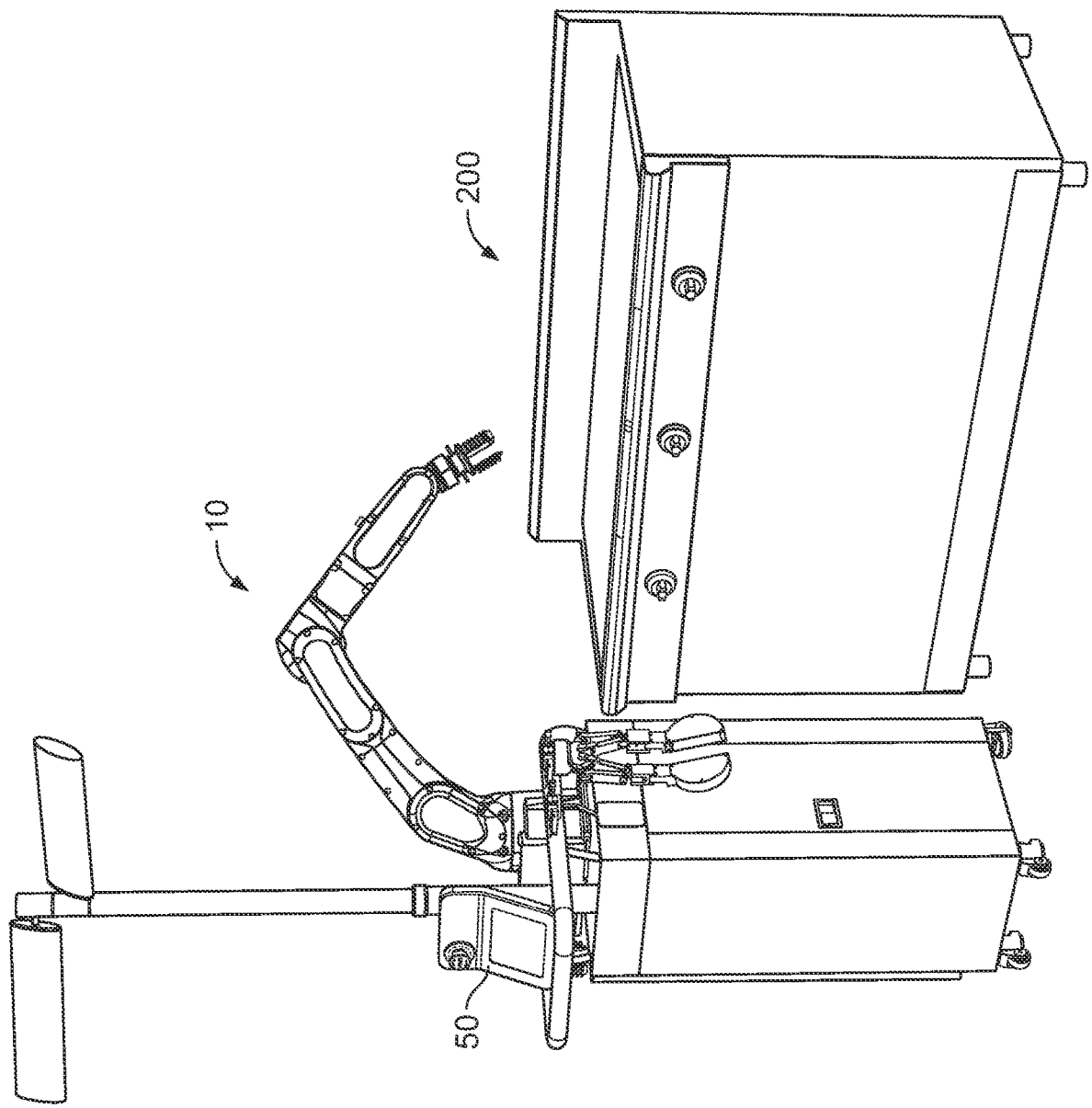
FIG. 4 illustrates a robotic kitchen assistant and a commercial grill.

With reference to FIG. 4, a standard electric grill 200 is shown adjacent a robotic kitchen assistant 10. Such a standard electric grill has a cooking surface that is 24 inches deep and 48 inches wide. This type of grill may be used for preparation of, e.g., burger patties, chicken, and onions. Knowledge of the grill specifications aids the robotic kitchen assistant 10 in being able to accurately place, collect, flip, remove, or otherwise prepare the food items thereon. FIG. 4 also shows a display 50 to indicate instructions and order status, amongst other things, to a human kitchen worker (not shown).

Figure 5:
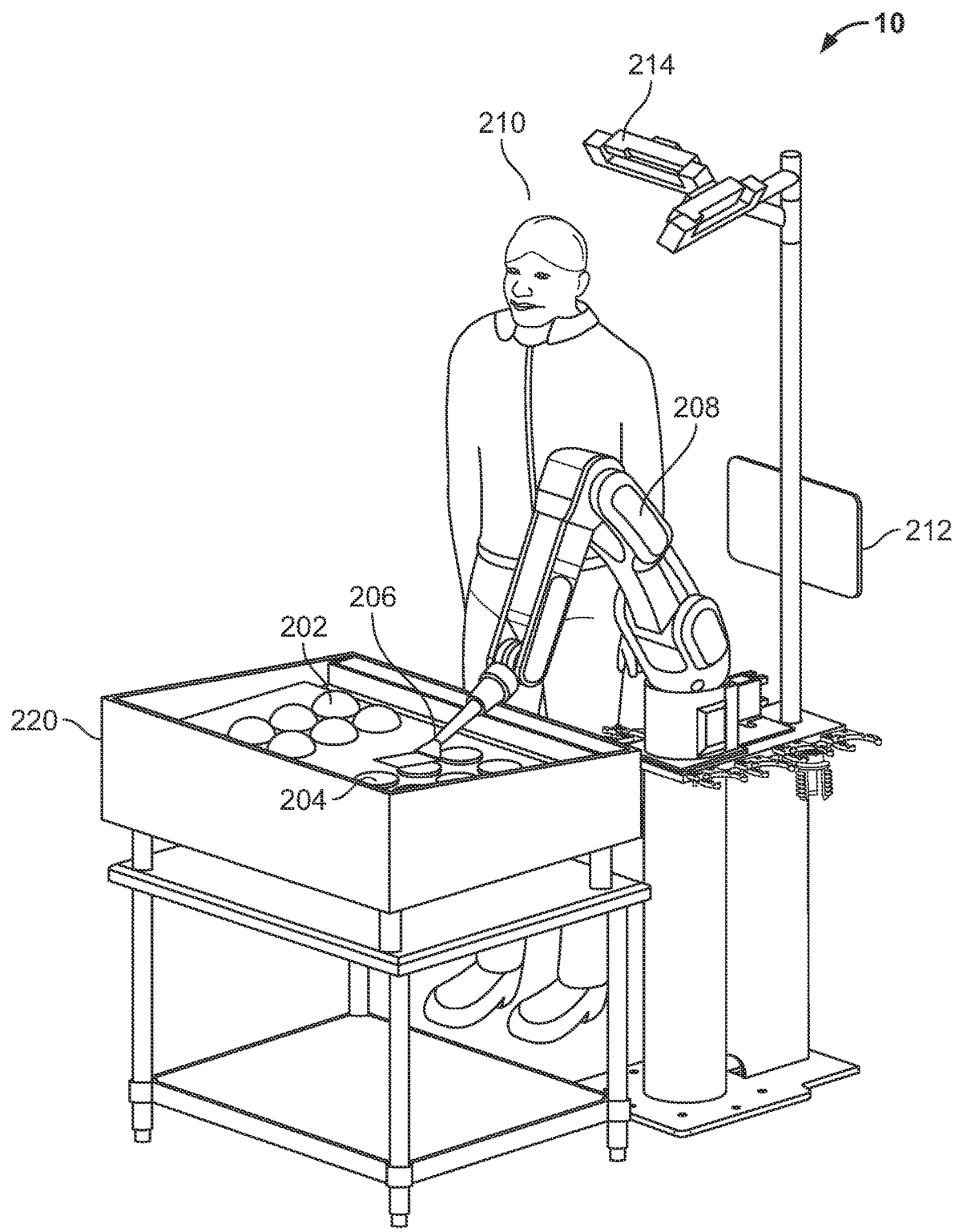
FIG. 5 illustrates a robotic kitchen assistant and grill, and carrying out a food manipulation step on a food item.

FIG. 5 shows another type of grill in close proximity to a robotic kitchen assistant 10 and human kitchen worker 210. Grill 220 is an electric grill that is 24 inches deep and 24 inches wide. Such a grill can be used for the preparation of, e.g., veggie patties 204 and buns 206.

As described herein, sensor bar 214 is shown aimed at the food items and provides data to the robotic kitchen assistant to: monitor status of relevant objects such as food items and location of human kitchen workers; determine the state of the system, next food preparation steps, what information to display on monitor 212; and to send commands to the arm 208 to execute the next food preparation steps.

In the embodiment illustrated in FIG. 5, the robotic kitchen assistant is shown having a spatula-shaped end effector 206 which serves to place buns 202 and raw patties 204 onto a grill 220, as well as to flip the patties when instructed to do so as described further herein and to remove such items from the grill. In other embodiments, the robotic kitchen assistant includes multiple end effectors such as tongs to place the bun, a spatula to place raw patties, and a separate spatula to flip and remove the patties. In embodiments, the spatula may be intermittently and constantly heated to prevent cross contamination of food items.

In embodiments, vibration or another motion is applied to the spatula and/or other end effector to prevent or reduce foods sticking to the end effector via an embedded actuator. For example, in one embodiment, vibration is generated by an electrical motor spinning with an off-axis load, a shaftless vibration motor, and/or by a piezo-electric actuator. In embodiments, the vibration is applied to a spatula that is used to flip burger patties on a grill surface and/or remove them from the grill and place them on another surface or food item such as a bun. The vibration is applied in the plane of the surface of the spatula, normal to the plane of the spatula, and/or along other axes, or a combination thereof. An example of an actuator appropriate for the application of vibration is the Model 310-112 10 mm Vibration Motor available from Precision Microdrives of London, UK. In embodiments, the vibration is turned on and off during different steps and/or different parts of a step. In embodiments, the vibration is used to prevent foods from sticking to spatula end effectors and enable more effective and accurate placement of food items. In embodiments, the vibration is used to improve the efficiency of cleaning operations performed by the arm, including but not limited to wiping the spatula against another surface to clean it and using a cleaning end effector to remove residual grease and food particles from a grill surface.

Figure 6:
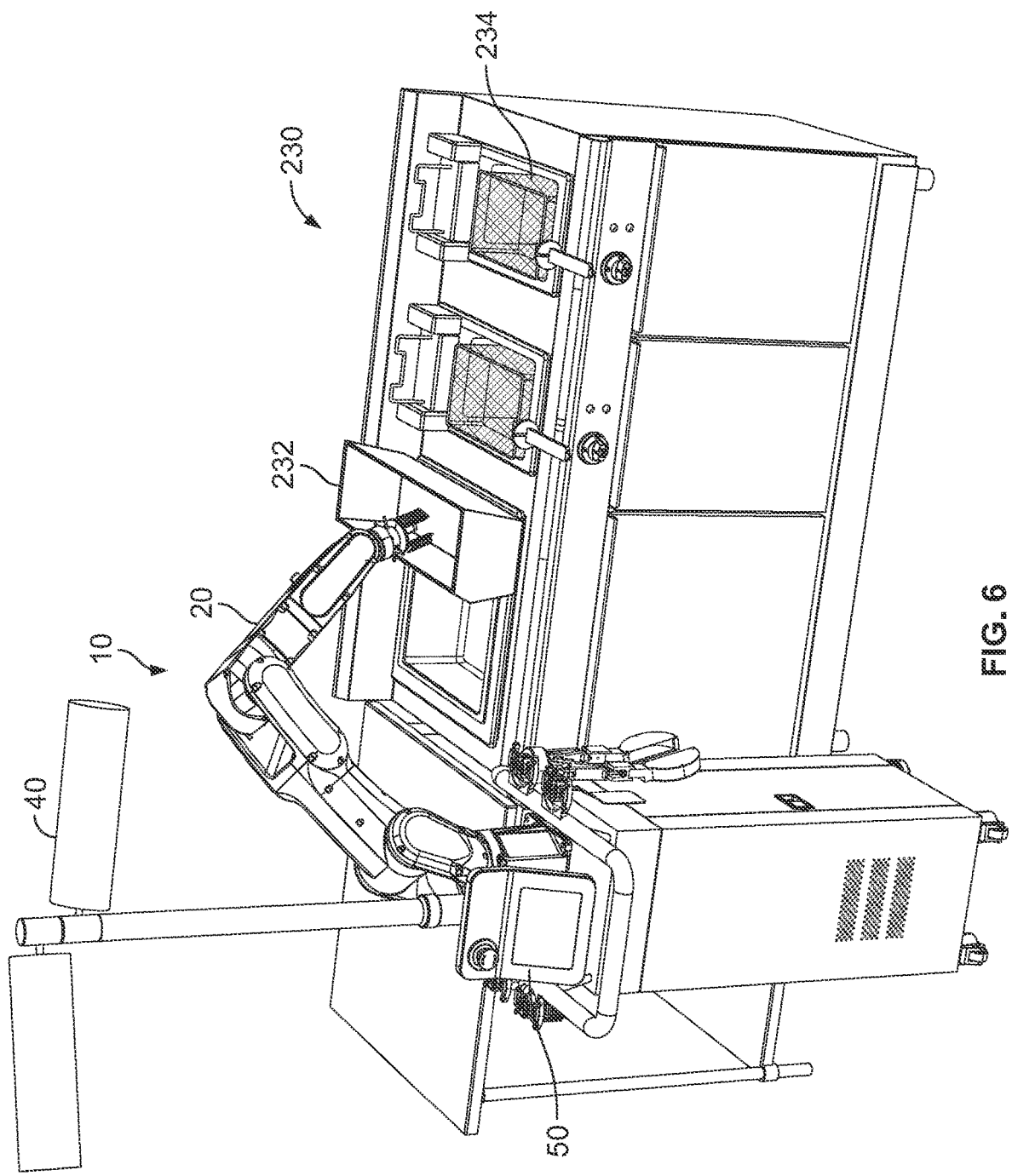
FIG. 6 illustrates a robotic kitchen assistant in combination with a commercial fryer in a kitchen environment.

With reference to FIG. 6, another type of kitchen equipment is shown, particularly, a commercial fryer 230. The commercial fryer 230 shown in FIG. 6 includes a receiving bin 232, and a plurality deep frying wells to accept fry baskets 234. The robotic kitchen assistant 10 is affixed to the floor adjacent the fryer 230, and such that robotic arm 20 and its end-effector are operable to move to, and grip fry baskets 234, and to empty its contents (e.g., French fries) into receiving bin 232. The robotic kitchen assistant also includes a sensor bar 40 aimed at fryer 230 and kitchen work space to collect data on the state of the system, described further herein. In embodiments, the robotic kitchen assistant automatically maintains an inventory of cooked French fries and human kitchen workers retrieve fries from the receiving bin as orders arrive. In some cases, the targeted inventory of prepared fries varies during the day. In embodiments, the robotic kitchen assistant will compute the target inventory of prepared fries based on historical demand. In embodiments, the robotic kitchen assistant monitors the temperature of the prepared fries. In embodiments, the robotic kitchen assistant uses temperature information data and information on when batches of cooked fries were completed, incoming orders, historical demand, and/or visual analysis of the prepared fries in the receiving bin (including amount remaining), to determine when to prepare additional fries.

A display 50 is mounted to the robotic kitchen assistant and can indicate instructions, status of the food items, and customer orders to a human kitchen worker (not shown). In embodiments, the robotic kitchen assistant instructs human kitchen workers when to place additional fries in the basket 234 so they can be cooked. In embodiments, the robotic kitchen assistant places an empty fry basket under an automatic dispenser (not shown) which dispenses uncooked French fries and then places the basket in the oil. In embodiments, the robotic kitchen assistant communicates with the automated French fry distributor.

Figure 7:
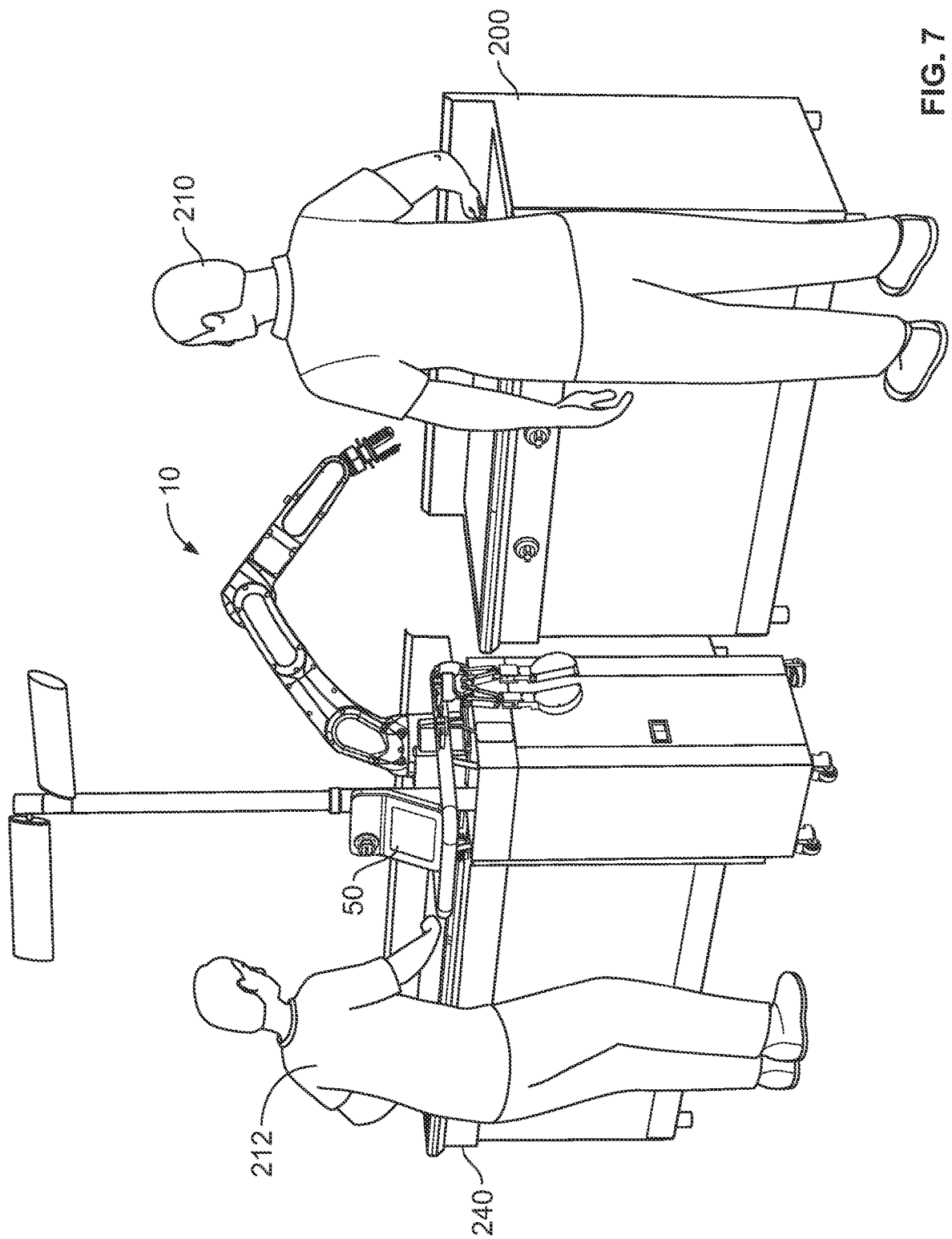
FIG. 7 illustrates a robotic kitchen assistant working in collaboration with human kitchen workers in a kitchen environment.

With reference to FIG. 7, another type of kitchen equipment is an assembly area and packaging area station 240 that contains work surfaces and bins with the various toppings that the customer can choose to order. The robotic kitchen assistant 10 is shown positioned between the grill 200 and the assembly area 240 with human kitchen workers 210,212 positioned at the grill and at the assembly area, respectively. After the human kitchen worker 210 at the grill 200 places food items from storage onto the grill (e.g., whether instructed by the restaurant KDS, the robotic kitchen assistant, or a restaurant order ticket), the robotic kitchen assistant is operable to automatically recognize, flip, call for additional ingredients to be applied by a human kitchen worker (if necessary), and move the food items to the assembly area 240. Then, the human kitchen worker 212 at the assembly station 240 can carry out the placement of toppings, application of packaging, and final bagging of the food items as desired. In embodiments, another robotic kitchen assistant performs these supplemental tasks.

Yet another type of kitchen equipment (not shown) is a storage unit for the various ingredients. Non-limiting examples of a storage unit include: a bin, cannister, cooling unit, shelves, pantry, etc. Indeed, there may be a wide variety of kitchen equipment, functionality, and configurations used with the present invention. Desirably, all kitchen equipment information including, e.g., the specifications, operating temperatures, operating times or threshold conditions, etc. are loaded to the robotic kitchen assistant such that the robotic kitchen assistant can use such information in computing instructions and commands to automatically perform various food preparation steps. In embodiments, a robotic kitchen assistant selects food items from a bin and places them into an automatic slicer.

Robotic Assisted Method to Prepare Food Items in Commercial Kitchen

Figure 8:
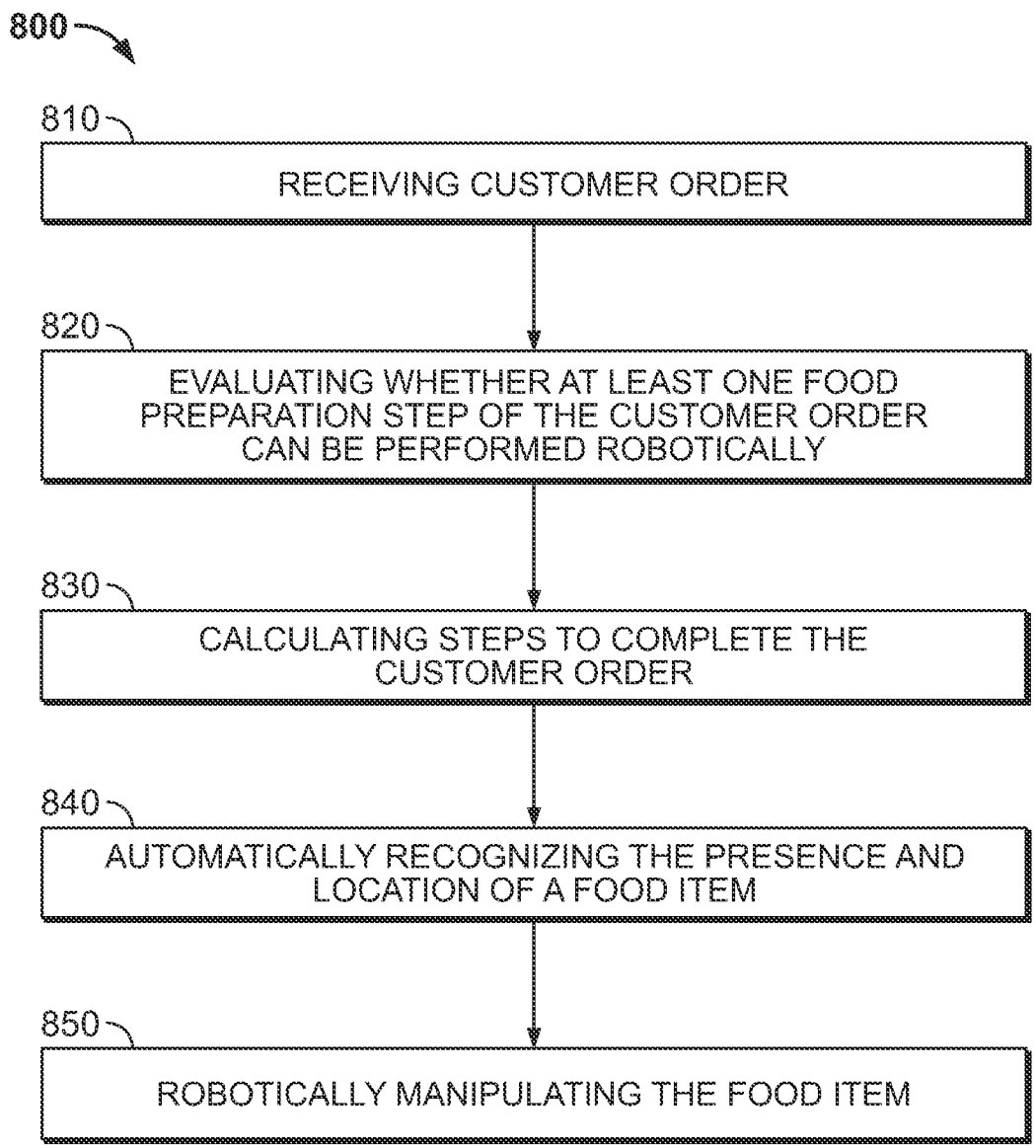
FIG. 8 is a flow diagram of a method for robotically manipulating a food item in accordance with an embodiment of the invention.

FIG. 8 is a flow chart illustrating a robotic assisted method 800 to prepare food items in collaboration with human kitchen workers in accordance with an embodiment of the invention.

Step 810 states to receive customer order. Examples of an order include eat-in orders, to-go orders. The orders typically shall specify a food item (e.g., hamburger), toppings (e.g., cheese, onion, etc.), and a customer name or other identifier. The customer orders shall typically require a plurality of steps to complete. Additionally, the step of receiving an order may be from a customer, employee, or an order internal to the kitchen such as preparing garnishes, keeping inventory, and preparing ingredients for later inclusion into customer orders.

Step 820 states to evaluate whether any part (or step) of the customer order can be prepared by the robotic kitchen assistant. For example, as described herein, the robotic kitchen assistant is trained to automatically place, flip, and/or remove certain food items. In embodiments, the step of evaluating compares the food items in the customer order to a list of food items that are prepared with at least one step performed by the robotic kitchen assistant.

Step 830 states to calculate the steps to complete the customer order. Step 830 could include determining the time to begin preparation of food item(s), what steps to perform, the sequence of the steps, when to end a step, and which steps could be performed by the robotic kitchen assistant or a human kitchen worker.

Determining when to end a step, or the endpoint of a step, can vary widely. In embodiments, the robotic kitchen assistant determines durations of the steps that have defined lengths, or in other embodiments, the robotic kitchen assistant determines target temperatures the food items shall reach during cooking steps. Still other techniques may be performed or computed to determine when or whether to end the steps, or when the steps are completed. Where the end of the step is determined by the food item reaching a target temperature, in embodiments, the robotic kitchen assistant monitors and tracks the temperature of the food item to determine when the step is completed.

The robotic kitchen assistant can determine when to start various tasks of the customer order based on a wide variety of factors, such as but not limited to: cooking time on a food item, cooking times on other food items in order, status of grill, status of existing orders, available space on grill, availability of human kitchen worker to perform necessary food preparation steps, estimated upcoming consumer demand for products (as could be determined by historical sales as a function of day and time) requiring any of the resources utilized in preparing the food items, temperature of items on the grill as estimated by an IR camera, time to completion of items already on grill, and estimated time to completion of items included in order.

In embodiments, and if a shape of the food item is not highly standardized (e.g., a chicken breast), volumetric analysis on the food item is performed to estimate the cooking time required and/or remaining cooking time required. In embodiments, data for the volumetric analysis is generated by the robotic kitchen assistant itself using its cameras, sensors, arms and/or end-effectors. For example, volume data for the volumetric analysis can be generated by the robotic kitchen assistant's sensors, visible spectrum cameras, 3D sensors, infrared cameras, LIDAR (namely, light detections and ranging), stereo vision cameras, and/or any of these or a combination of these sensors and cameras.

In embodiments, the weight of the item to be cooked is determined using a weight sensitive end-effector or the robotic arm to estimate cooking time and/or remaining cooking time required. In embodiments, when the food item is manipulated by the weight sensitive end-effector, weight can be calculated to assist in determining the volume or other data relevant to the food preparation step. The weight of the food item can be helpful to assist in determining the target surface temperature of the food item. In embodiments, an IR camera is used to measure the surface temperature of the not highly standardized food item being prepared in order to estimate cooking time and/or remaining cooking time required. In embodiments, multiple measurements of the not highly standardized food item are taken by one or more sensors. In embodiments, IR camera also measures the temperature of other surfaces of the food item. In embodiments, the robotic kitchen assistant uses a temperature probe placed on the arm or end effector to directly measure internal temperature of not highly standardized food items. In embodiments, a combination of these previously described techniques is used.

Indeed, in embodiments, the analysis to establish timing performed in step 830 can take into account all tasks the robotic kitchen assistant needs to perform and the current state of all relevant items including but not limited to food items, predicted demand, human kitchen workers, storage bin levels, kitchen equipment, etc. To monitor the state of the all relevant items, in embodiments, the robotic kitchen assistant maintains state information on a wide variety of items involved in the robotic kitchen assistant's tasks including, for example: customer orders; food items, including position, orientation, and time on grill; human kitchen workers, including position, orientation, and tasks assigned to them; ingredient bins, including how much ingredients they currently contain; and kitchen equipment, including temperature and cleanliness. However, in some embodiments, only some of the above listed things are tracked.

In embodiments, when a first step is determined to be performed by the human kitchen worker, the robotic kitchen assistant may communicate to the human kitchen worker at the grill to place the item(s) onto the grill or onto an existing item on the grill (e.g., cheese onto a burger patty) and then, automatically recognize the presence of the food item(s). The robotic kitchen assistant then verifies that the human kitchen worker properly performed her step. The robotic kitchen assistant may then perform a next step. In embodiments, the robotic kitchen assistant may perform a first step, signal for the human kitchen worker to perform a second step, verify that the second step has been performed, and then perform a third step. In embodiments, the robotic kitchen assistant may perform a step or instruct a human kitchen worker to perform a step based on data obtained dynamically by the robotic kitchen worker's cameras and/or sensors. For example, IR measurements of the top surface of a steak being prepared on a grill may be combined with other data, including time the food object has been on the grill, thickness of the food item, and temperature of the steak to predict the internal temperature of the steak and, thereby, when to remove the food item from the grill. In embodiments, a first order thermal model may be used to aid in the prediction of the internal temperatures of the steak. In embodiments, a convolutional neural network could be trained to aid in the prediction of the internal temperature of the steak.

In embodiments, the removal of the food item from storage and placement onto the grill in a specific location or on top of another food item may be automated and controlled by the robotic kitchen assistant. Alternatively, the robotic kitchen assistant may instruct the human kitchen worker to place the food item in a specific location.

In embodiments, the robotic kitchen assistant will automatically identify when a step has been performed by the human kitchen worker. In embodiments, such identification will trigger the timing of performing a next step.

In embodiments, some or all of the workspace accessible by the robotic kitchen assistant is divided into a grid. Food items are placed or transferred to spaces in the grid. In embodiments, additional preparation instructions are displayed to human kitchen workers that reference the position of particular items in the grid.

In embodiment, instructions are projected directly onto work surfaces and/or food items.

Step 840 states to automatically recognize the presence and location of a food item. This step may use the sensors and visual recognition algorithms described herein to confirm a food item has been placed and to determine exact position of the item. It may also be used to determine if a necessary food preparation step has been performed by a human kitchen worker or another automated piece of food preparation equipment.

In preferred embodiments, step 840 is performed continuously to locate and recognize objects (whether the objects are food items, utensils, human kitchen workers or portions thereof) to update the state of the system so that the appropriate food preparation steps may be communicated to human kitchen workers or performed by the robotic kitchen assistant. Accordingly, when a new food item, along with the other things described above, is placed or detected by the robotic kitchen assistant, the new object is tracked such that the robotic kitchen assistant maintains a state of all relevant items. For example, the robotic kitchen assistant can monitor the presence of the food item and the time remaining to cook the item. In embodiments, the robotic kitchen assistant monitors the internal temperature of the food item to determine when the food item is done cooking.

Additionally, if a food item preparation step is anticipated to be performed such as placing a new item on the grill, the robotic kitchen assistant can verify that the human kitchen worker at the grill performs the specified steps. In embodiments, the robotic kitchen assistant can indicate to the human kitchen worker to perform the missing step by, e.g., an alarm, or visual display.

Step 850 states to robotically manipulate the food items. Once a time period has elapsed, or another threshold condition is met (such as reaching an estimated internal temperature that indicates a food item is done), the robotic kitchen assistant physically manipulates the food item using the robotic arm and end-effector. As described further herein, the processor computes the movement (namely, the 3D motion) for the robotic arm based on information from the receiving step, recipe information, equipment information, time information computed in the calculating step, upcoming food preparation steps that the robotic arm will perform, and the state of the food items being tracked. For example, the robotic kitchen assistant may flip, move items to the assembly area, or otherwise manipulate food items as needed to optimize efficiency in carrying out the customers' order(s) from step 810.

Still many other steps may be carried out by the robotic kitchen assistant as desired and are intended to be included in the invention. For example, the robotic kitchen assistant may call for additional ingredients as needed and communicate final preparation instructions for the human kitchen worker at the assembly area.

Figure 9:
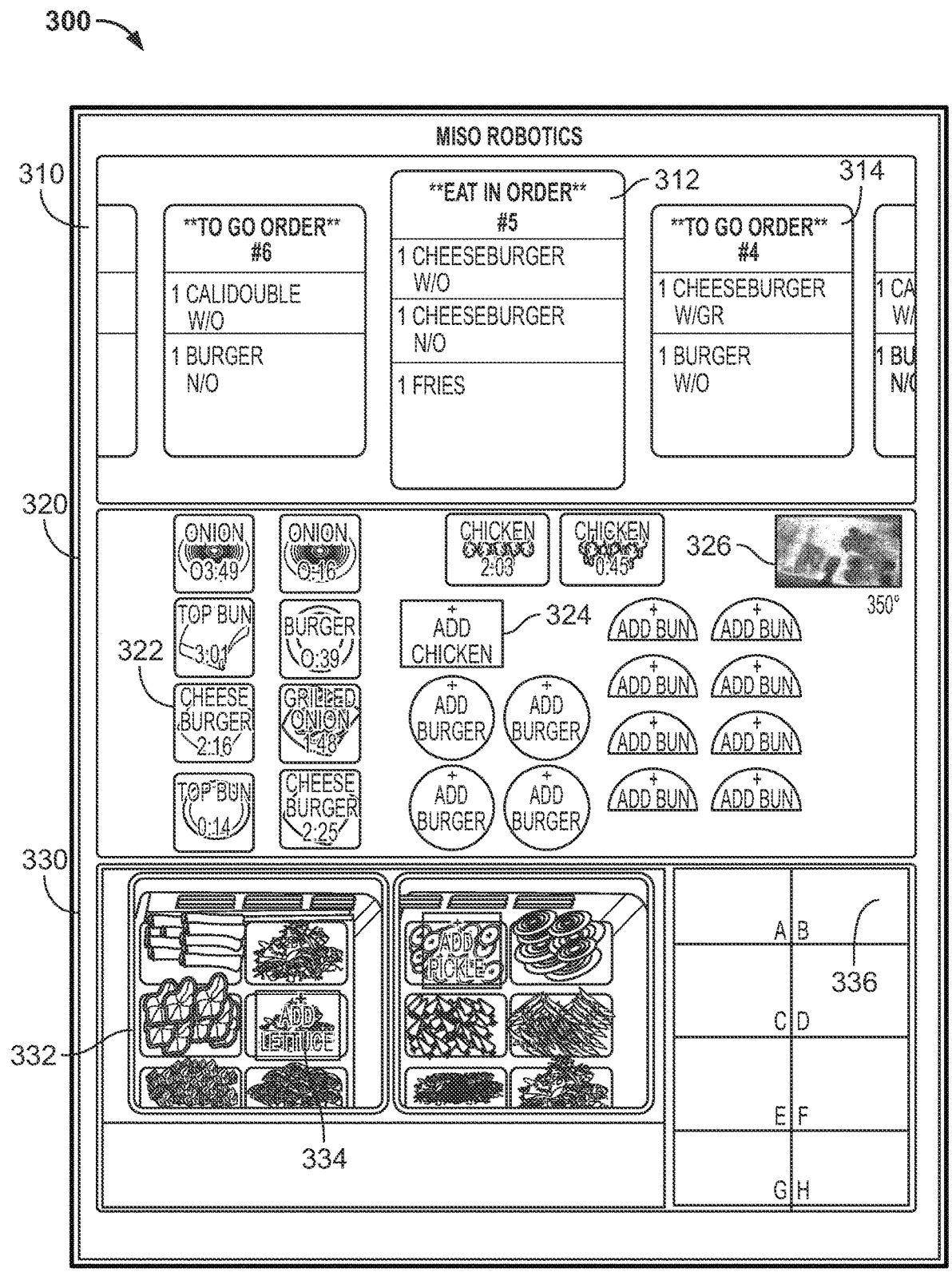
FIG. 9 illustrates a graphical user interface with instructions for a human kitchen worker.

FIG. 9 illustrates a graphical user interface (GUI) 300 of a display for communicating instructions and status of food items with human kitchen workers in accordance with an embodiment of the invention.

The GUI 300 shows an order window 310, grill window 320, and assembly window 330.

Order window 310 shows, in real time, different types of customer order information such as an eat in order 312 and to go order 314. Each order may feature identifying label, a food item, menu item, topping or other modification. As orders are received, the robotic kitchen assistant carries out the methods described herein and posts the status of the order in the order window 310. As orders are completed, the robotic kitchen assistant removes the order from the screen or otherwise identifies it as completed.

Grill window 320 shows a real time image of the grill including all food items placed thereon 322. As described herein, the food items are recognized and located as they are placed on the grill. In the embodiment shown in FIG. 9, the image is augmented with labels on top of each food item. Additional information is displayed with the food item including time remaining to complete cooking.

Grill window 320 also indicates instructions to add new food items such as to add chicken 324, or add burger, or add bun in view of the customer order information, timing estimates, state status of the food items, and recipe information.

Grill window 320 additionally shows a real time infrared image 326 of the grill and a computed temperature associated with the grill. The use of infrared cameras or sensors, as discussed in more detail herein, assist not only for temperature evaluation, but also in food item recognition and location and for monitoring internal temperature of the food items on the grill.

Assembly window 330 shows, in real time, the food and assembly area including food item bins 332 and augments the image with instructions requesting more ingredients when an ingredient is below a threshold amount. For example, the instruction to "ADD LETTUCE" (corresponding to reference numeral 334) is displayed over the low/empty lettuce bin.

Additionally, a portion of the workspace accessible by the robotic kitchen assistant is shown divided into a grid 336 and food items can be transferred to spaces A-H in the grid and additional preparation instructions can be displayed that reference the position of particular items in the grid.

Software Modules

Figure 10:
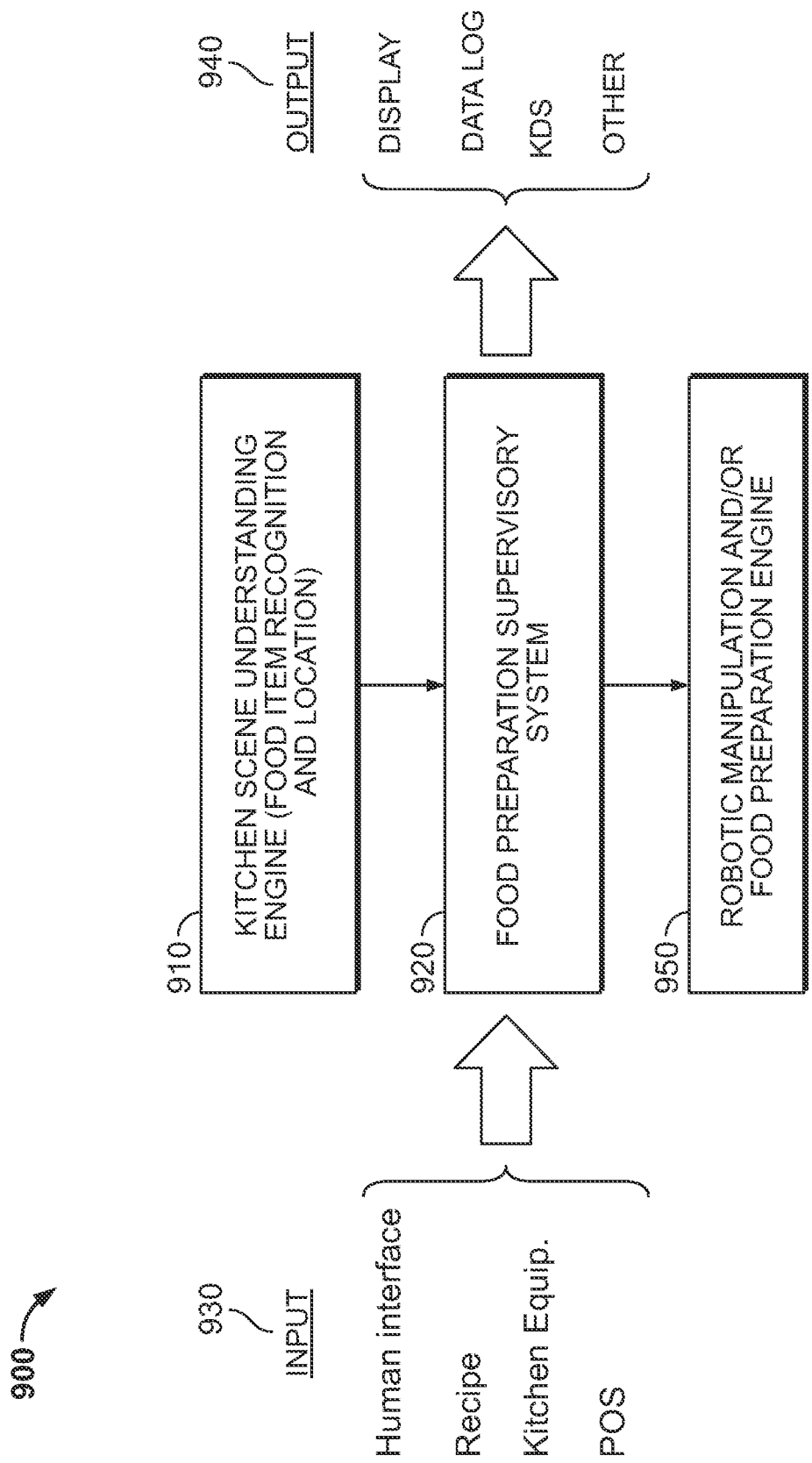
FIG. 10 depicts various software modules of a robotic kitchen assistant in accordance with embodiments of the invention.

FIG. 10 depicts an overview of various software modules or engines 900 in accordance with an embodiment of the invention and which are run on the processor or server(s) described herein.

Kitchen Scene Understanding Engine

FIG. 10 shows a Kitchen Scene Understanding Engine (KSUE) 910 which is operable to receive the camera and sensor data described above. The KSUE computes the food item type and location information.

In embodiments, the KSUE carries out the following steps for image processing and localization.

Initially, the color image data are retrieved from the cameras as three arrays of pixels (one per RGB color channel). The data are scaled and/or distorted to 416×416 pixels.

A predictive algorithm (e.g., a CNN as described below) is applied to the image data to obtain an output vector with a length equal to the number of objects the system is capable of recognizing and an associated probability for the presence of each.

In embodiments, also returned is a bounding box which gives approximate position of each item.

In embodiments, additional algorithms can be employed to compute more exact localization including edge detection, Hough transformation for circular objects, and other algorithms as is known to those of ordinary skill in the art.

The objects and locations are returned to the main process flow and to update a system state machine which, in embodiments, is part of the KSUE 910.

Convolutional Neural Network

In embodiments, a convolutional neural network (CNN) in combination with additional computer vision-related algorithms can be used for the object recognition and localization.

In embodiments, a CNN is implemented with YOLOv2; built on GoogLeNet; implemented on an Nvidia GTX 1080 using CUDA 8.0 and cuDNN; operates on 416×416 images; and trained to recognize the following 14 objects, not including combinations: (burger patty, burger paper, cheese, top bun, bottom bun, hand, arm, body, head, chicken breast, onion, bacon, spatula, food fragment, end effector, grill cleaner, and burger with cheese. In embodiments, the total number of objects that the KSUE can recognize is preferably at least 5, and in some embodiments is at least 20. However, except as recited in the appended claims, the invention is not so limited.

CNN Training

In embodiments, the CNN is trained using visual data for the items, with approximately 300 images per item. A backpropagation algorithm is used to adjust the convolutional weights. Repetitive data is then pruned to prevent overfitting.

In some embodiments, generation of some or all of the training data of the CNN is performed at the restaurant where the robotic kitchen assistant will be used. In some such embodiments, the robotic arm places the food item in various locations for observation by the camera to generate training data. In some embodiments, other factors are varied throughout the process, such as lighting, cooking state, and presence of other objects.

Alternative or additional visual recognition algorithms may be employed to locate and recognize the food items including, e.g., the algorithms detailed in provisional patent application No. 62/592,130, filed Nov. 29, 2017, and entitled "AN INFRARED-BASED AUTOMATED KITCHEN ASSISTANT SYSTEM FOR RECOGNIZING AND PREPARING FOOD AND RELATED METHODS" which is incorporated herein by reference in its entirety.

FIG. 10 also shows Food Preparation Supervisory System (FPSS) 920 communicating with the KSUE for location information. The FPSS keeps track of the state of the relevant items and is operable, as described further herein, to compute the steps/instructions for the human kitchen worker and/or robotic arm to complete the customer order. The FPSS is a computational engine utilizing a wide range of inputs 930 such as, but not limited to, recipe, inventory, POS and order information, human inputs, and kitchen equipment specifications. The FPSS also accepts and is updated with the type and location of the food items and kitchen objects computed by the KSUE 910.

In embodiments, the KSUE and FPSS operate together to maintain a state of all relevant variables in the system, including: (a) position, orientation and shape of all food items; (b) position, orientation, and current tasks/steps assigned to all human kitchen workers; (c) ingredients remaining in all ingredients bins; (d) Temperature of all ingredients; (e) Temperature of grilling surface; (f) cooking times remaining for each food item; and (g) the state of the machine is updated as new operations arrive.

FIG. 10 shows output information 940 including a display, restaurant KDS, and data log.

After the instructions are computed by the FPSS 920, the instructions/commands are delivered to the robotic manipulation engine 950 to compute and execute the motion of the robotic arm and end-effector.

Motion Planning

Motion planning for the robotic arm is carried out in robotic manipulation engine 950. A wide range of algorithms and methods can be used to ensure safe, efficient, and effective performance of the robotic arm as are known to those of ordinary skill in the art. Non-limiting examples are described in SPRINGER HANDBOOK OF ROBOTICS, B. SICILIANO & O. KHATIB, published by SPRINGER-VERLAG BERLIN (2008). The motion and timing is determined and the corresponding signals/commands are sent to the controller, motion driver, and/or pneumatic system to execute.

However, embodiments of the invention make improvements to address specific challenges faced by the robotic kitchen assistant. In some embodiments, cameras and other sensors are constantly watching for the presence of a human kitchen worker in the path of the robotic arm and will signal an immediate stop, different path, or to slow down, if a human is detected.

In embodiments, a visual sensor is trained onto human kitchen workers in the area and estimates their movements and likely upcoming movements to inform the motion of the robotic arm. In some embodiments, human kitchen worker hand signals are understood by the robotic kitchen assistant.

In embodiments, the robotic kitchen assistant is operable to detect and locate beacons or wearables carried on the human kitchen worker to assist in locating the human kitchen worker, and otherwise communicate with the robotic kitchen assistant.

In embodiments, the system also uses knowledge of which tasks have been assigned to specific workers to further improve estimates of potential movements.

In embodiments, when the robotic kitchen assistant is placing new food items onto the grill or communicating to a human kitchen worker where food items should be placed, the robotic kitchen assistant selects the position using data on placement of all current food items and upcoming steps it will need to perform among other inputs so as to maximize the throughput of the system. In embodiments, maximization of throughput efficiency is obtained by minimizing the time necessary to perform all required actions.

ALTERNATE EMBODIMENTS

Though the invention has been described above in connection with various specific embodiments, it is to be understood that other modifications and variations can be made to the disclosed embodiments without departing from the subject invention.

For example, in some embodiments, the robotic kitchen assistant is not connected into the POS system, and will instead use visual recognition and recipe data to determine what steps to apply to cook a food item that is detected by the system. Orders will be handled by the human kitchen worker at the grill who will read the order and place the appropriate food items on the grill. In embodiments, this automatic detection and preparation of food items is done in combination with the order-based operation described earlier, such as to enable a human kitchen worker to prepare a replacement for a food item without having to enter an order into the system.

In some embodiments, in addition to the POS, the robotic kitchen assistant uses other variables to obtain more accurate estimates on when to start a new food item, including staffing levels, staffing of particular individuals at particular stations, order history, grill temperature, time of day, number of customers in line, number of cars in restaurant parking lot, or state of other variables.

In some embodiments, the robotic kitchen assistant learns the motions necessary to perform new tasks by analyzing video of the task performed by a human kitchen worker. The robotic kitchen assistant uses visual recognition to identify items and how they are handled to complete the task. In some embodiments, a human supports the identification of objects.

In some embodiments, the robotic kitchen assistant is teleoperated to perform some tasks.

In some embodiments, the robotic kitchen assistant instructs the human kitchen workers using displays (e.g., a LED monitor or transparent glass screen) or glasses showing portions of the kitchen workspace and food items in real time and augmented with instructions (e.g., AR glasses). A description of displays, projections, and glasses enhanced or augmented with the instructions are described in No. 62/467,735, filed Mar. 6, 2017, and entitled "VISUAL INSTRUCTION DISPLAY SYSTEM TO ENHANCE EFFICIENCY OF WORKERS"; and co-pending International Patent Application No. PCT/US18/20948, filed Mar. 5, 2018, and entitled "AUGMENTED REALITY-ENHANCED FOOD PREPARATION SYSTEM AND RELATED METHODS".

In some embodiments, the robotic kitchen assistant is operable to control or manipulate controls of the kitchen equipment. The robotic kitchen assistant monitors the food items on the equipment and the temperatures of the equipment such as temperature for an oven, fryer or grill. The robotic kitchen assistant can determine when to turn on, turn off, and adjust the temperatures to optimally carry out customer orders.

The steps of the method may be continued or repeated to prepare other food items in a customer order, and/or to prepare other food items in additional customer orders. It is also to be understood, however, that in some embodiments, some of the above described steps are skipped and/or combined, and other steps are added in any combination or sequence logically possible except where the steps are exclusive to one another.

Other modifications and variations can be made to the disclosed embodiments without departing from the subject invention.

We claim:

1. A robotic kitchen assistant system for preparing a plurality of food items in a kitchen environment, the system comprising:
    a base and support frame housing;
    a plurality of wheels arranged along the base and operable to allow the system to be rolled across a floor and adjacent kitchen equipment;
    a foot pedal extending from the base and including an interlocking feature adapted to lock and release to a mating mounting fixture attachable to the floor;
    a robotic arm extending from the housing, and comprising an end;
    a tool changer coupled to the housing;
    a plurality of tools held by the tool changer, each tool being detachably mountable to the end of the robotic arm, and at least one tool being actuatable by a motion driver in the housing, and wherein one of the plurality of tools is a weight sensitive tool operable to determine the weight of the food item to be cooked when the food item is being manipulated by the weight sensitive tool;

a sensor assembly fixed above the housing by an elongate vertically-extending frame element, and comprising a plurality of cameras aimed at a kitchen workspace including the robotic arm for preparing the plurality of food items, wherein at least one of the plurality of cameras is an IR camera operable to generate IR data of the food items;

a computer arranged within the housing and comprising a processor operable to:
- compute a volume of the food item based on the weight calculated from the weight sensitive tool;
- determine an estimated cooking time based on the volume;
- determine a target surface temperature of the food item based on the weight calculated from the weight sensitive tool;
- compute a measured surface temperature of the food item based on the IR data,
- determine a remaining cooking time based on the IR data and the target surface temperature arising from the weight sensitive tool;
- track system state and compute food preparation instructions based on the system state, and data from the at least one camera, order and recipe information, wherein the food preparation instructions comprise food preparation steps for the robotic arm, and optionally the human kitchen worker, to complete;
- command the robotic arm to perform a food preparation step on the plurality of food items in the kitchen workspace based on the compute step and while constantly monitoring for the presence of a human kitchen worker in the path of the robotic arm and signal an immediate stop, different path, or to slow down, if a human kitchen worker is detected; and a display coupled to the housing and operable to show to the human kitchen worker (a) status of the orders in real-time, and (b) food items being cooked in real-time, and optionally augmenting each food item being displayed with said remaining cooking time.

2. The robotic kitchen assistant system of claim 1, wherein the processor is operable to recognize each of the plurality of food items or food preparation items.

3. The robotic kitchen assistant system of claim 2, wherein the processor is operable to recognize kitchen equipment and position of a human kitchen worker.

4. The robotic kitchen assistant system of claim 3, wherein the processor is operable to recognize each of the plurality of food items, kitchen equipment, and the human kitchen worker by employing a convolutional neural network.

5. The robotic kitchen assistant system of claim 1, wherein the processor is operable to update the system state with current or new order information, recipe information, kitchen equipment information, and location information.

6. The robotic kitchen assistant system of claim 1, wherein the sensor assembly comprises a heated transparent cover inhibiting materials arising in the kitchen environment from collecting on the cover.

7. The robotic kitchen assistant system of claim 1, further comprising a fan directing air over the sensor assembly.

8. The robotic kitchen assistant system of claim 1, wherein the processor is operable to determine a command for a food manipulating tool based on instructions from a source remote to the kitchen environment.

9. The robotic kitchen assistant system of claim 1, wherein the display is operable to show the food items and locations in the kitchen augmented with instructions for a human kitchen worker.

10. The robotic kitchen assistant system of claim 1, further comprising an input device for accepting information from a human kitchen worker.

11. The robotic kitchen assistant system of claim 1, wherein the processor is connected with a restaurant point of sale (POS) to receive order information.

12. The robotic kitchen assistant system of claim 1, wherein the processor is further operable to compute the volume of the food item based on the data from the sensor assembly, and to determine a cooking time based on a combination of data arising from at least the sensor assembly and the weight sensitive tool.

13. The robotic kitchen assistant system of claim 1, wherein the processor is further operable to automatically determine an instruction to display to the human kitchen worker based on the estimated internal temperature of a food item.

14. The robotic kitchen assistant system of claim 1, wherein one of the plurality of tools comprises
- a temperature probe operable to manipulate the food item as well as to collect internal temperature of the food items;
- wherein the sensor assembly, temperature probe, and processor are operable to detect the presence of the food item being placed on a grill, monitor the food item for a threshold condition, and robotically manipulate the food item when the threshold condition has been met.

15. The robotic kitchen assistant system of claim 14, wherein the threshold condition is an internal temperature of the food item.

16. The robotic kitchen assistant system of claim 1, wherein one of the tools has incorporated therein a vibrator to vibrate the tool.

17. The robotic kitchen assistant system of claim 14, wherein the temperature probe contains a heater to raise the temperature of the probe to an elevated level between readings in order to prevent cross contamination of food items.

18. The robotic kitchen assistant system of claim 1, wherein the display is further operable to show in real time a food assembly area including food items bins, and optionally to show the food items bins augmented with instructions requesting more ingredients when an ingredient is below a threshold amount.

19. A method for assisting human kitchen workers in a commercial kitchen to prepare food comprising:
- providing a robotic kitchen assistant system as recited in claim 1;
- moving the robotic kitchen assistant on the wheels from a first location to a second location in the commercial kitchen;
- securing the robotic kitchen assistant system to a second mounting fixture attached to the floor at the second location in the commercial kitchen;
- receiving a customer order;
- calculating steps to complete the customer order by the computer; and
- robotically manipulating a food item according to the calculating steps, serving to complete the customer order.

20. The method of claim 19, further comprising, prior to the moving step, releasing the robotic kitchen assistant system from a first mounting fixture attached to the floor at the first location, wherein the releasing comprises depressing the pedal.

\* \* \* \* \*